United States Patent [19]
McLamb et al.

[11] Patent Number: 5,359,597
[45] Date of Patent: Oct. 25, 1994

[54] MICROCONTROLLER-BASED CONCENTRATOR FOR A DATA NETWORK

[75] Inventors: Curtis G. McLamb, Sterling; Timothy E. Dunavin, Rock Falls, both of Ill.

[73] Assignee: Antec Corporation, Rolling Meadows, Ill.

[21] Appl. No.: 127,636

[22] Filed: Sep. 27, 1993

[51] Int. Cl.$^5$ .............................................. H04J 3/14
[52] U.S. Cl. ...................................... 370/56; 370/85.1
[58] Field of Search .................... 370/85.4, 85.5, 56, 370/67, 5, 85.1, 85.15; 340/825.05

[56] References Cited

U.S. PATENT DOCUMENTS

| | | | |
|---|---|---|---|
| 5,034,738 | 7/1991 | Ishihara et al. | 370/56 |
| 5,099,473 | 3/1992 | Gupta et al. | 370/56 |
| 5,132,832 | 7/1992 | Matz et al. | 370/85.5 |

*Primary Examiner*—Douglas W. Olms
*Assistant Examiner*—Min Jung
*Attorney, Agent, or Firm*—Allegretti & Witcoff, Ltd.

[57] ABSTRACT

A microcontroller based multiple access unit for use in interconnecting a plurality of computers with a token ring data network. The microcontroller monitors a phantom voltage applied by a computer to determine whether the computer should be inserted into, or withdrawn from, the network. The microcontroller also monitors a manual activation device to determine whether any computer that is not providing a phantom voltage is still interconnected to the network. In such a case, the microprocessor withdraws the computer from the network. A coil-pair is directly interconnected to a plurality of microprocessor gates. The microcontroller activates the coil-pair in one manner to cause the computer to be brought into the network and reverses the plurality of the coil-pair so as to withdraw the computer from the network. The controller further includes a circuit to inhibit operation of the microcontroller when the supply voltage is unstable.

5 Claims, 4 Drawing Sheets

MICROCONTROLLER-BASED CONCENTRATOR FOR A DATA NETWORK

BACKGROUND OF THE INVENTION

The present invention relates generally to concentrators that allow different computers to communicate over a data network and, more particularly, to a "dumb" multiple access unit concentrator for a local area network, such as a token ring network. Such concentrators are generally well known and are described, for example, in the Institute of Electronics and Electrical Engineers ("IEEE") Standards for Local Area Networks: Token Ring Access Method and Physical Layer Specifications (Approved Jun. 2, 1989; Std 802.5-1989).

The IEEE Standard discusses the compatible interconnection of dam processing equipment, via a local area network, using the token-passing ring access method. A token ring consists of a set of stations serially connected by a transmission medium, such as, for example, a twisted pair of conductors, coaxial cable, or optical fiber. As set forth in the IEEE Standard:

Information is transferred sequentially, bit by bit, from one active station to the next. Each station generally regenerates and repeats each bit and serves as the means for attaching one or more devices (terminals, work stations) to the ring for the purpose of communicating with other devices on the network. A given station (the one that has access to the medium) transfers information onto the ring, where the information circulates from one station to the next. The addressed destination station(s) copies the information as it passes. Finally, the station that transmitted the information effectively removes the information from the ring.

A station gains the right to transmit its information onto the medium when it detects a token passing on the medium. The token is a control signal comprised of a unique signalling sequence that circulates on the medium following each information transfer. Any station, upon detecting an appropriate token, may capture the token by modifying it to a SFS [start-of-frame sequence] and appending appropriate control and status fields, address fields, information fields, FCS [frame check sequence] and EFS [end-of-frame sequence].

Id. at 20–21. Prior concentrators include, for example, devices such as that shown in U.S. Pat. No. 5,132,832. The patent describes a token ring concentrator for a series of computers having data ports. As disclosed in the abstract of the patent, circuits are disclosed that provide a global reset capability for all of the ports. The circuitry includes transistors that function to both provide a path for the global reset pulse to the reset coils and to isolate each reset coil in a port from the reset coils of the other ports. Other circuitry is shown for preventing activation of the global reset function from affecting an active port.

Some available concentrators may not reliably set, or insert, a computer into a token ring network or reliably reset, or withdraw, the computer from the network. Other concentrators are time consuming or expensive to manufacture. Still others may unexpectedly move between inserting and withdrawing the computer upon being subjected to sudden movement or a mechanical shock.

SUMMARY OF THE INVENTION

In a principal aspect, the present invention is a multiple access unit concentrator for a communications channel. The concentrator includes a plurality of ports that may interconnect to a plurality of computers. Each computer may generate a phantom voltage to indicate whether it should be interconnected to the communications channel. Each concentrator port includes a switch that may insert a computer into, or withdraw a computer from, the communications channel, and a microcontroller. The microcontroller monitors the phantom voltage and an activation signal and responsively connects the computer to, or disconnects the computer from, the channel.

A coil is directly interconnected to a plurality of the microcontroller gates to responsively connect the computer to, or disconnect the computer from, the channel. Further, the concentrator includes a delay circuit to inhibit operation of the microcontroller when a supply voltage is unstable.

Thus, an object of the present invention is an improved multiple access unit concentrator. Still a further object is an improved multiple access unit concentrator that is more reliable. Still a further object is a concentrator that is less expensive and complex to manufacture. These and other objects, features, and advantages of the present invention are discussed or apparent in the following detailed description.

BRIEF DESCRIPTION OF THE DRAWINGS

A preferred embodiment of the present invention is described herein with reference to the drawings wherein.

DETAILED DESCRIPTION OF THE PREFERRED EMBODIMENT

Figure 1:
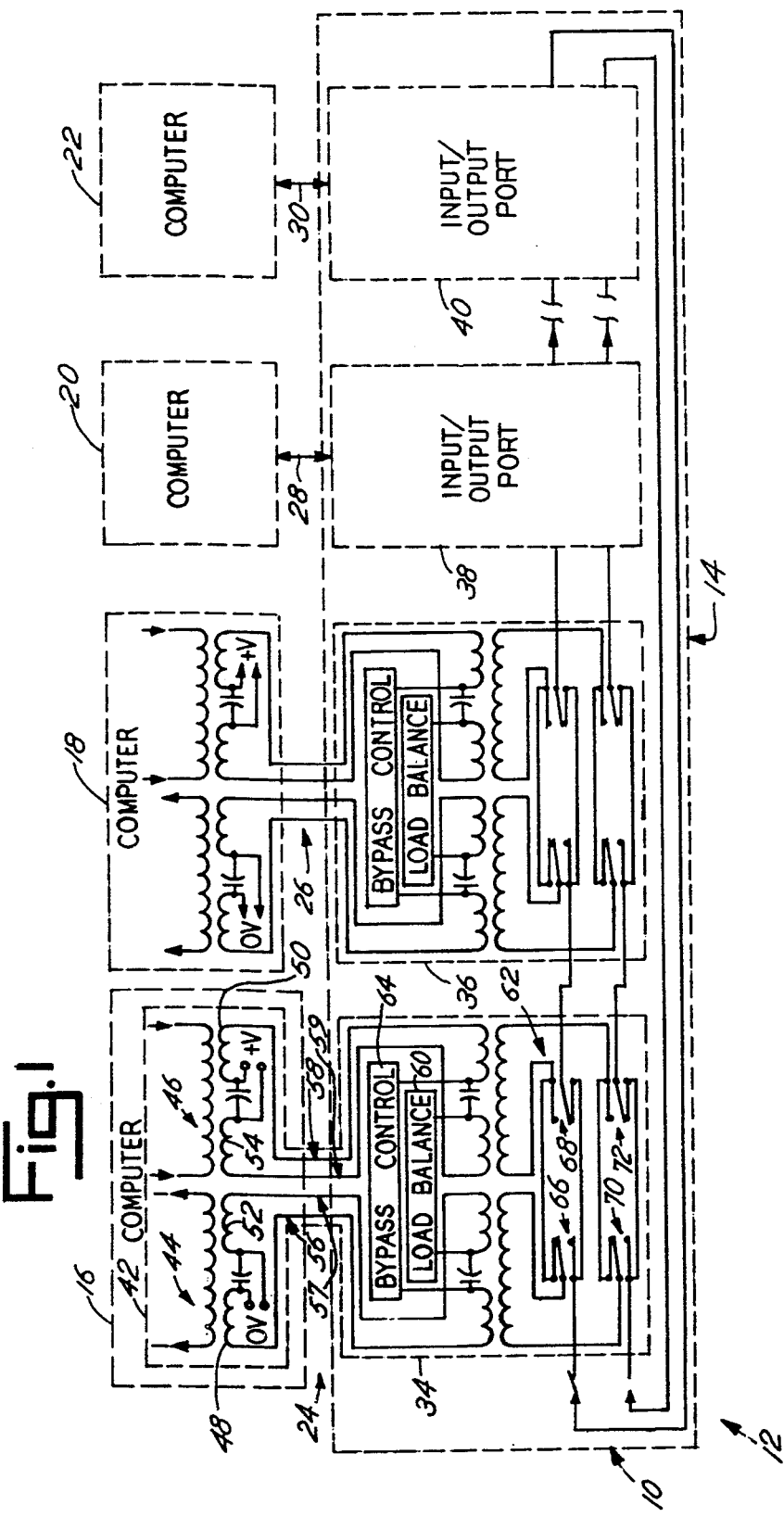
FIG. 1 is a general schematic diagram of a token ring concentrator employing the present invention.

Referring to FIGS. 1–4, the preferred embodiment of the present invention is shown as a microcontroller-based, multiple access unit concentrator 10 for a token ring data network 12. The concentrator 10 includes a transmission medium, such as an endless, two-wire communications channel, or token ring 14, and is used in conjunction with a plurality of data processing machines, such as computers 16, 18, 20, 22, and a plurality of conductors 24, 26, 28, 30. The concentrator 10 may properly be described as "dumb" in the sense that it derives its operating power from the computers 16–22, rather than an unrelated power source.

FIG. 1 shows the general arrangement of a token ring concentrator. The concentrator 10 uses such a configuration, allowing the computers 16–22 to be interconnected via the token ring 14, as set forth, for example, in the IEEE Standard 802.5. For purposes of illustration, only four computers 16–22 are shown in FIG. 1, although a substantially larger number may be used.

The concentrator 10 includes a plurality of ports 34, 36, 38, 40, each of which is interconnected to the token ring 14. For the purposes of illustration, only the first computer 16 and the corresponding first port 34 of the concentrator 10 are described below. The exemplary computer 16 includes a token ring adaptor 42 interconnected to the conductor 24.

In accordance with the IEEE Standard 802.5, the computer's token ring adapter 42 has separate receive and transmit transformers 44, 46. Each transformer 44, 46 has first and second coils 48, 50, 52, 54. Each of the first coils 48, 50 is direct current ("DC") isolated from, but alternating current ("AC") signal coupled to, the corresponding second coil 52, 54. The receive transformer 44 is interconnected to a receive pair of conductors 56, 57, and the transmit transformer 46 is interconnected to a transmit pair of conductors 58, 59.

The conductors 56, 57, 58, 59 carry a phantom voltage from the computer's token ring adapter 42 to the port 34 of the concentrator 32. The transmit pair of conductors 58, 59 carry a positive DC voltage signal, and the receive pair of conductors 56, 57 carry a substantially zero DC voltage signal.

Prior art concentrators, which meet the requirements set forth in the IEEE Standard 802.5, utilize a latching relay and a control circuit. The latching relay has both a set coil and a separate reset coil for each port. The latching relay in the port inserts a computer into, and withdraws the computer out of, the token ring. Insertion of the computer is accomplished when the computer attached to the port, or lobe, sends out a low level DC voltage to the concentrator. Such a voltage is effectively "transparent" to the equipment sending and receiving data within the token ring network. Therefore, the voltage is referred to as a "phantom" voltage. The phantom voltage is insufficient to directly control a relay that will insert or withdraw any of the ports from the network.

A prior art concentrator may include a capacitor and high and low voltage threshold detectors. The capacitor is charged by the phantom voltage until the high voltage threshold detector senses that a threshold voltage level has been reached. The high voltage threshold detector may include resistors, used as a voltage divider, and a programmable unijunction transistor. When the threshold is reached, the capacitor is discharged through the set coil of the latching relay. The set coil inserts the computer into the token ring network. The latched condition of the relay remains stable, keeping the port and computer in the network, for as long as the phantom voltage is present.

A prior art low voltage threshold detector may utilize a voltage divider and a second unijunction transistor and is used to detect the absence of the phantom voltage. Whenever the communications channel is disconnected, or the computer stops transmitting the phantom voltage, the low voltage threshold detector causes the second unijunction transistor circuit to conduct. As a result, the capacitor is discharged through the reset coil of the latching relay. This removes the computer from the token ring and restores the ring with the absence of the computer. Thus, with a computer withdrawn, data will be directly transferred between active computers, even though one or more computers have been withdrawn from the token ring.

Returning to FIG. 1, in accordance with the IEEE Standard 802.5, each of the ports 34–40 must have a static resistive load between 2.9 kilohms and 5.3 kilohms. The phantom voltage is provided by the computer 16 through the two pairs of conductors 56, 57, 58, 59 to ground. The concentrator 32 must provide resistive loads that are balanced within 5% for the two circuits. A load balance 60 normally keeps the load for each circuit balanced within 5% of each other across the required voltage range of 3.5 volts to 7 volts DC.

Still referring to FIG. 1, the port 34 of the concentrator 10 further includes a latching relay 62 and bypass control 64. The contacts of the latching relay 62 includes contacts 66, 68, 70, 72 that are used to selectively insert or withdraw the computer 16 with respect to the token ring 14. The bypass control 64 within the port 34 controls such switching action.

The latching relay used in a typical, prior art token ring concentrator includes a four pole, double throw, two coil latching relay. The latching relay coils respond to the presence or absence of the phantom voltage impressed on the token ring by the computer.

Such prior art coils are often substantially vulnerable to a mechanical shock associated with transportation and handling. Thus, a relatively mild, mechanical shock may cause a relay to disengage from its set or reset state, and, thus, effectively render the token ring data network inoperative. Consequently, a reset circuit is useful, such that any port that is not receiving a phantom voltage from a computer is moved to the reset, or withdrawn, state.

Figure 2:
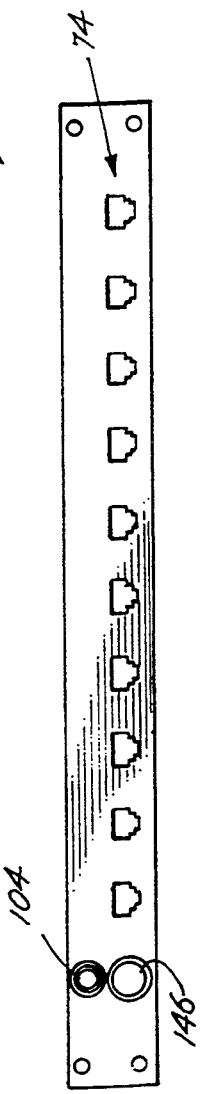
FIG. 2 is a front view of the present inventions.

FIG. 2 shows the front of the preferred embodiment of the concentrator 10. The concentrator 10 is rack mountable and includes a plurality of RJ style sockets, such as RJ 45 jacks 74, which may receive the conductors 24–30 from the computers 16–22.

Figure 3:
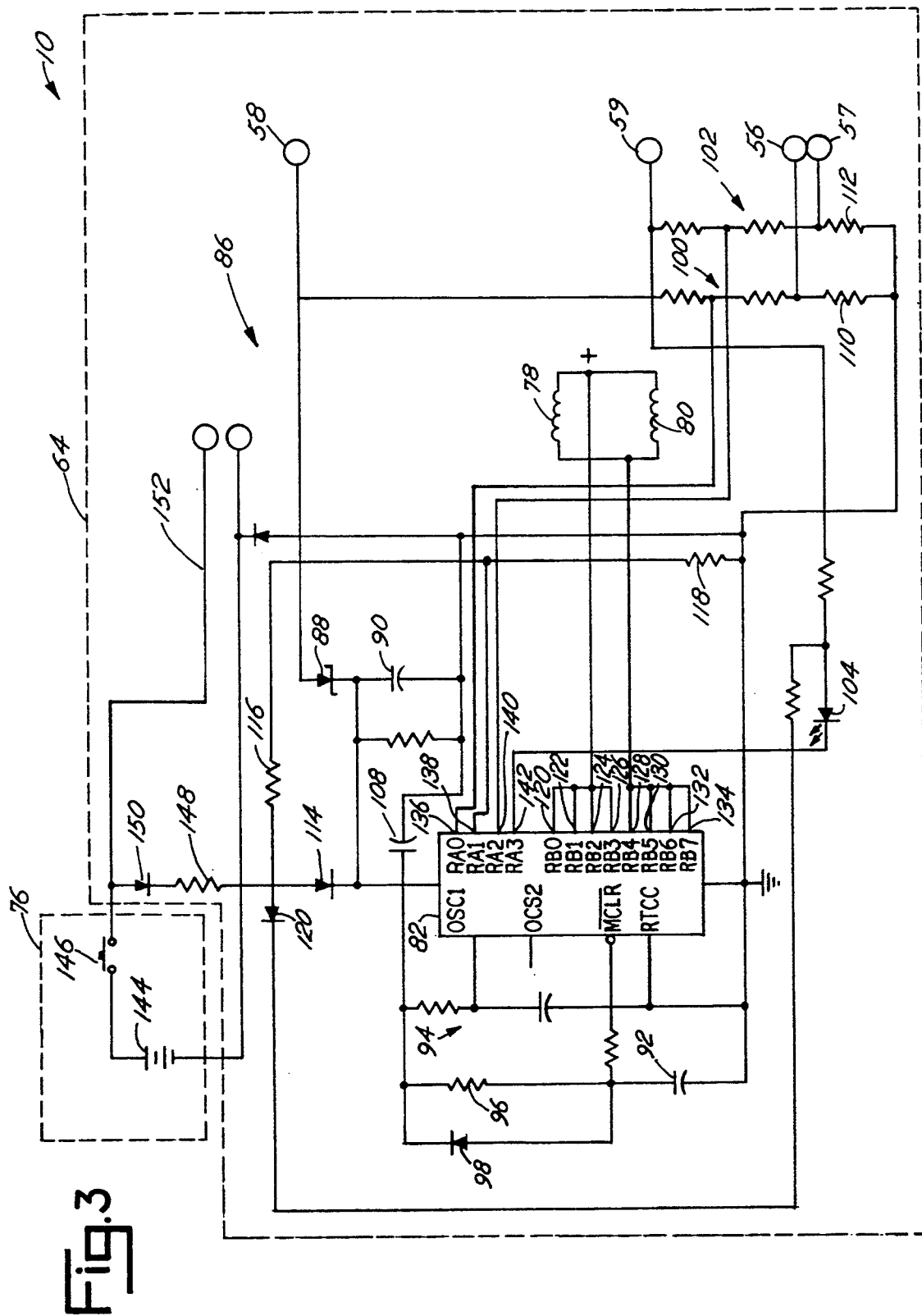
FIG. 3 is a schematic diagram of the bypass control used in the preferred embodiment shown in FIG. 2.

FIG. 3 shows the bypass control 64 that makes the decisions in the concentrator 10 based upon the voltages present at the controlling inputs, as well as a manual reset activation control 76. The latching mechanism 62 includes a pair of coils 78, 80 in a parallel configuration ("coil-pair"), as shown in FIG. 3, or equivalently, a larger, single coil. With the configuration shown in FIG. 3, both coils 78, 80 respond in the same way to a particular pulse.

The control 64 includes a microcontroller 82 and support circuitry 86. The support circuitry 86 includes an isolating Shotkey diode 88, first and second capacitors 90, 92, resistor-capacitor network 94, resistor 96, diode 98, divider networks 100, 102, light emitting diode 104, resistor 106, capacitor 108, resistors 110, 112, diode 114, resistors 116, 118, and diode 120.

The microcontroller 82 may be, for example, a PIC 16C54-RC-P microprocessor manufactured by Microchip Technology Inc. The microcontroller 82 includes a first plurality of four output gates 120, 122, 124, 126 (RB0, RB1, RB2, and RB3), a second plurality of four output gates 128, 130, 132, 134 (RB4, RB5, RB6, and RB7), as well as monitoring gates 136, 138, 140, 142 (RA0, RA1, RA2, and RA3).

When a phantom voltage from the computer 16 occurs, current flows through the Shotkey diode 88, causing the first capacitor 90 to charge. When the capacitor 90 is charged sufficiently to allow operation of the microcontroller 82, an internal clock, in conjunction with the resistor-capacitor network 94, starts oscillating at approximately 20 kilohertz. The second capacitor 92 is charged at a slower rate, since the resistor 96 slows the current flow through the capacitor 92, which retards the initial operation of the microcontroller 82. Since the initial operation of the microcontroller 82 is retarded, there is sufficient time for the voltages supplied to the microcontroller 82 to stabilize before the microcontroller 82 begins operation.

The diode 98 discharges the capacitor 92 when the power supply, or input, is removed from the control 64.

The positive DC voltage input also supplies power to the divider network 100.

The center of the divider network 100 is connected to the RA0 gate 136 of the microcontroller 82. The RA0 gate 136 of the microcontroller 82 is continually monitored by a program for the presence or absence of the phantom voltage.

The presence of the phantom voltage supplied by the computer 16 at the positive DC voltage input side of the load balance 60 supplies power to the light emitting diode 104. The light emitting diode 104 is also connected to the RA3 input 142 of the microcontroller 82.

The voltage divider network 102 is interconnected to the zero DC voltage input from the computer 16. The voltage divider network 102 is connected to the RA2 gate 140 of the microcontroller 82. The RA2 input 140 is continually monitored by the program for the presence or absence of the phantom voltage.

When the microcontroller 82 is operating under normal conditions and receiving a phantom voltage from the computer at the RA0 and RA2 inputs 136, 140, a positive going voltage pulse is supplied (3 ms at a time) by the microcontroller to the RB0, RB1, RB2, and RB3 gates 120–126. Simultaneously, the microcontroller 82 holds the RB4, RB5, RB6, and RB7 gates 128–134 low. This causes current to flow through the coils 78, 80, which inserts the port 34 and computer 16 into the token ring 14.

Next, the RA3 gate 142 of the microcontroller 82 is forced low, which forward biases the light emitting diode 104. Consequently, the light emitting diode 104 glows, indicating the port's insertion into the ring 14. This condition remains stable until the phantom voltage is removed from the inputs.

When the phantom voltage is removed from the inputs by the computer 16 (or by removing the cable of the token ring 14), the condition is detected by the microcontroller input gates RA0 and RA2 136, 140. The microcontroller 82 then switches the RA3 gate 142 to a high state, which stops the flow of current through the light emitting diode 104.

Next, the microcontroller 82 supplies a positive going voltage pulse to the RB4, RB5, RB6, and RB7 gates 128–134, while holding the RB0, RB1, RB2, and RB3 gates 120–126 at a low voltage. This causes a reverse current to flow through the coils 78, 80. As a result, the computer 16 is isolated from the token ring 14. The use of a plurality of microprocessor gates 120–134, interconnected as shown, allows the microcontroller 82 to drive the coil-pair 78, 80 directly.

Since no power is supplied to the control 64 during this period when the computer 16 is isolated, energy stored in the capacitor 90 is used to power the control 64. The resistor 106, which is connected across the capacitor 90, is used to gradually discharge the capacitor 90 when no power is being supplied from the phantom voltage or the reset activation control 66. The capacitor 108 is a decoupling capacitor used to dampen noise that may be generated by the microcontroller 82 and affect the operation of other circuit components. The resistors 110, 112 are used by the bypass control 64 and load balance 60 as a ground reference.

A reset of all computers 16–22 on the token ring 14 is accomplished by using the control 76. The control 76 includes an internal battery 144, a manually operable button or switch 146, resistor 148, diode 150, and bus 152. Pressing the button 146 causes a six to nine volt pulse from the battery 144 to be applied to the bus 152.

The bus 152 is interconnected to the diode 150 and to a similar diode in all other ports 36–40 within the concentrator 10. The diode 150 supplies a voltage to the resistor 148, which is used as a current limiter.

The diode 114 is forward biased when the switch 146 is closed and, consequently, power is supplied to the microcontroller 82. The diode 114 is also used to prevent the phantom voltage from affecting the control 76.

The resistors 116, 118 create a voltage divider with a center voltage reference at the RA1 gate 138 of the microcontroller 82. The RA1 gate 138 is continually monitored by software within the microcontroller 82. When the switch 146 is depressed, a positive voltage is transmitted to the RA1 gate 138. This condition, in the absence of a phantom voltage on the RA0 and RA2 gates 136, 140 of the microcontroller 82, will result in a positive-going voltage pulse being generated by the microcontroller on the RB4, RB5, RB6, and RB7 gates 128–134, while the microcontroller 82 holds the RB0, RB1, RB2 and RB3 gates 136–142 at a low voltage. This action causes any relay not previously in the bypass position to be reset. As a result, all computers 16–22 on the token ring 14 are isolated if they are not transmitting a phantom voltage to a port of the concentrator 10.

The diode 120 is forward biased when the switch 146 is closed, thereby supplying a voltage to the light emitting diode 104. The software running within the microcontroller 82 repeatedly alternates the RA3 gate 142 between a positive voltage and a low voltage condition. The low voltage condition causes the light emitting diode 104 to conduct. The alternating positive voltage condition causes the light emitting diode 104 to emit a visible, blinking signal.

If the phantom voltage is present at the RA0 and RA2 gates 136, 130 of the microcontroller 82 when the switch 146 is depressed, the positive signal at the RA1 gate 138 is ignored by the microcontroller 82. The combination of the resistor networks 100, 102 serve as static loads for balancing, as required by the IEEE Standard 802.5.

Thus, the concentrator 10 complies with existing token ring concentrator guidelines set forth, for example, in IEEE Standard 802.5, while still providing a more reliable concentrator that is easier and less expensive to manufacture. As discussed above, each of the relays has a single coil or coil-pair that is used for both inserting and withdrawing the computer 16 from the token ring network 14. Such relays have superior mechanical shock characteristics, which eliminate the need for mounting the circuitry with a shock absorbing material within the casing of the concentrator 10. The single microcontroller 82 (found within each port within the concentrator 10) reverses the polarity of the coil-pair 78, 80 as required.

During the total test, or reset, function of the concentrator 10, the microprocessor 82 resets any port that has a relay latched in the set condition and that, nonetheless, is not receiving a phantom voltage from the respective computer 16–22. The light emitting diode 104 blinks while the reset button 146 is depressed, to indicate the proper functioning of the microcontroller 82 and the associated circuits, such that the computer 16 is properly inserted into the token ring 14 when the computer 16 is generating a phantom voltage and the computer 16 is withdrawn from the token ring 14 when the computer 16 is not generating a phantom voltage.

The resident program also allows the microcontroller 82 to conduct a self-test sequence. The self-test sequence is initiated when an operator pushes and holds the reset button 146. In such a case, the microcontroller 82 conducts a test of itself and the function of the corresponding lobe. If the self-test procedure indicates that the microcontroller 82 and lobe are functioning properly, the microcontroller 82 issues a periodic pulse to the light emitting diode 104. The resulting blinking light indicates to the operator holding in the reset button 146 that the microcontroller 82 has received the request to conduct the self-test sequence and that the microcontroller 82 and associated lobe are functioning normally.

Figure 4A:
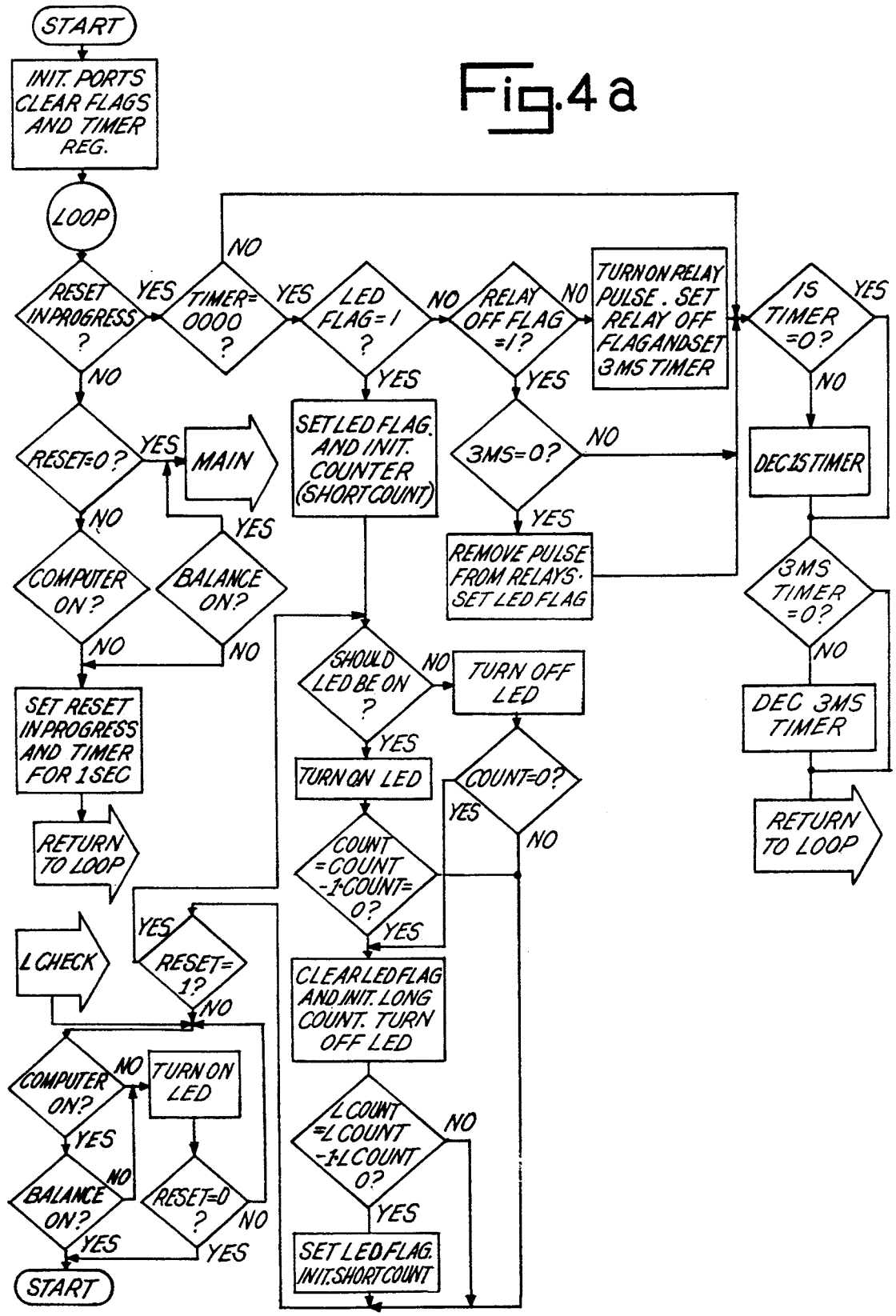
FIGS. 4a and 4b comprise a flow chart of the process used by the microcontroller shown in FIG. 3.
Figure 4B:
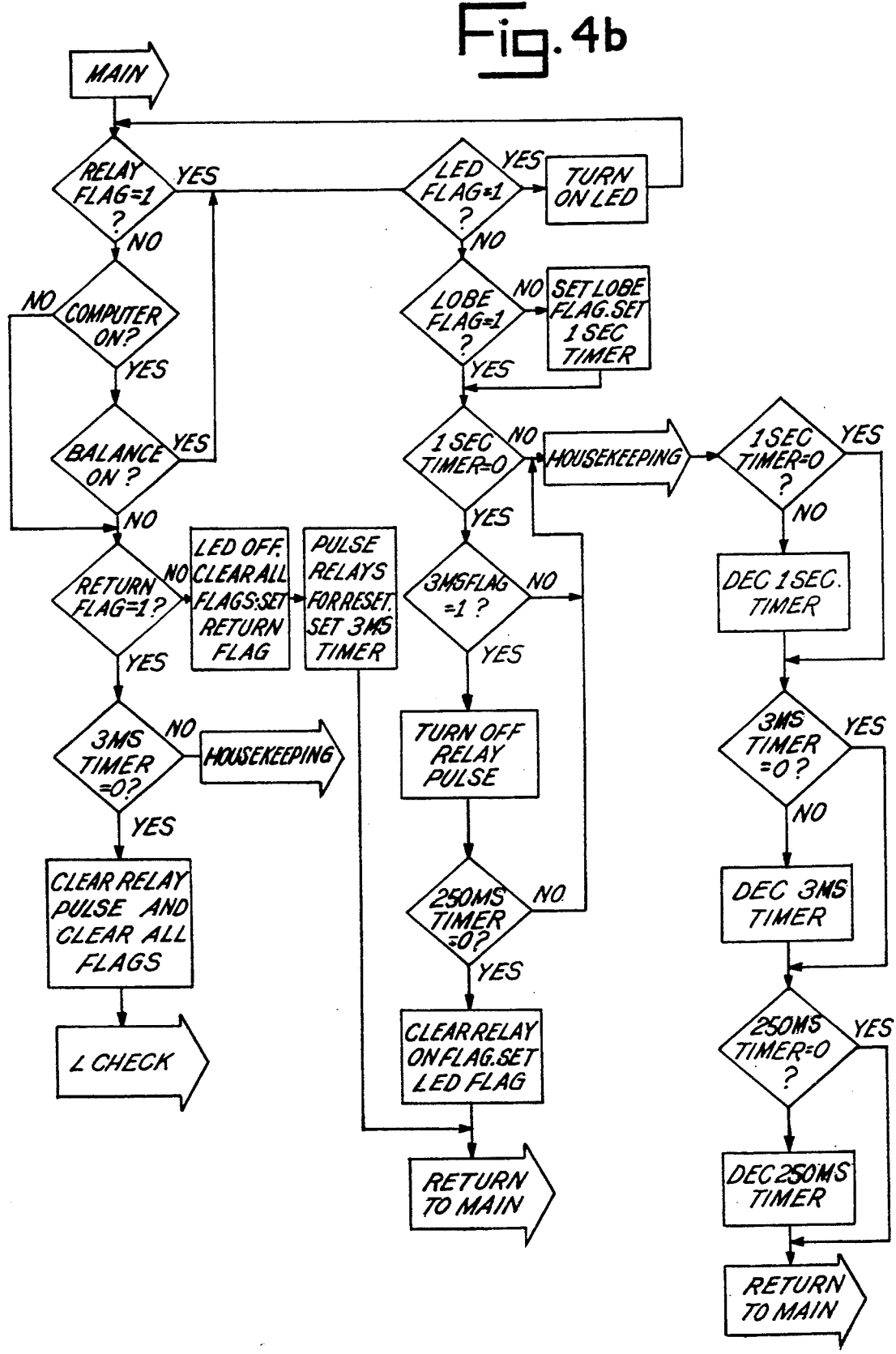

Referring to FIG. 4, an overview of the program used by the microcontroller 82 is shown. Upon start up, the microcontroller 82 is initialized and all flags and timers are reset. If the phantom voltage is detected (and the Balance Circuit is on) a 3 mS pulse is applied to the coil-pair 78, 80. The computer 16 also tests whether the relay flag has been "raised," such that the computer 16 should be inserted into the token ring 14.

Although the foregoing description of the preferred embodiment will enable a person of ordinary skill in the art to make and use the invention, the following assembly language program listing for the microcontroller 82 is included. The listing provides detailed information concerning the operation of the overall system.

```
; Variables and equates
;
LR1      =    RA.0
RSET     =    RA.1
LR2      =    RA.2
LED      =    RA.3
;
RYCON    =    RB
;
         ORG  8                    ;start address of file register variable space
;
FLAGS    DS   1
RIP      =    FLAGS.0              ;RESET in process
LEDI     =    FLAGS.1              ;LED flag
ROFF     =    FLAGS.2              ;Relay off flag
FLED     =    FLAGS.3              ;Flashiing LED flag
LOB      =    FLAGS.4              ;Lobe on flag
RON      =    FLAGS.5              ;Relay on flag
T3       =    FLAGS.6              ;3mS timer flag
RTN      =    FLAGS.7              ;Reteun flag
T1SL     DS   1                    ;Timer registers
T1SH     DS   1
T3MS     DS   1
T250     DS   1
COUNT    DS   1                    ;LED counter
COUNT1   DS   1
;
         ORG  0                    ;reset code origin
;
;
; Device data
;
DEVICE   PIC16C54,RC_OSC,WDT_OFF,PROTECT_ON
;
ID       7F07H
;
; Reset address
;
RESET    START
;
;
; Power-up entry
;
START    MOV  !RA,#007H            ;Port RA inputs, except RA.3
         MOV  !RYCON,#0            ;Port RB all outputs
         SETB LED                  ;Turn off LED
         MOV  RYCON,#0             ;RY1 and RY2 = 0
         MOV  FLAGS,#0             ;Clear all flags
         MOV  T1SL,#0              ;Clear all timers
         MOV  T1SH,#0
         MOV  T3MS,#0
         MOV  T250,#0
;
LOOP     NOP                       ;Do nothing
;
         JB   RIP,DORST            ;Is reset in process?
         JNB  RSET,MAIN            ;Is reset hi?
         JNB  LR1,SRIP             ;LR1 hi?
         JB   LR2,MAIN             ;If yes, check LR2 and if hi, goto MAIN
SRIP     SETB RIP                  ;Set reset in process flag
         MOV  T1SL,#0FFH           ;Set timer foe 1 Sec.
         MOV  T1SH,#003H
         JMP  LOOP                 ;Return
;
DORST    MOV  W,T1SH               ;Is timer = 0000?
         JNZ  HOUSE                ;If Z = 0, goto House keeping
         JB   LEDI,FLASH           ;LED flag = 1?, if yes, goto FLASH
```

-continued

| | JB | ROFF,CRLY | ;Is relay off flag set?, if yes, goto CRLY |
|---|---|---|---|
| | MOV | RYCON,#0F0H | ;Pulse relays for reset |
| | SETB | ROFF | ;Set relay off flag |
| | MOV | T3MS,#5 | ;Set timer for 2 loops |
| ; | | | |
| HOUSE | MOV | W,T1SH | ;Is 1S timer = 0000? |
| | JZ | H1 | ;If Z = 1, goto H1 |
| | DJNZ | T1SL,H1 | ;T1SL = T1SL −1 |
| | DEC | T1SH | ;T1SH = T1SL −1 |
| H1 | MOV | W,T3MS | ;Is 3mS timer = 00? |
| | JZ | LOOP | ;If Z = 1, LOOP |
| | DEC | T3MS | ;T1SL = T1SL −1 |
| | JMP | LOOP | ;Return |
| ; | | | |
| CRLY | MOV | W,T3MS | ;Is 3mS timer = 00? |
| | JNZ | HOUSE | ;If Z = 0, goto House keeping |
| | MOV | RYCON,#0 | ;Remove pulse from relays |
| | SETB | LEDI | ;Set LED flag |
| | JMP | HOUSE | ;Goto house keeping |
| ; | | | |
| FLASH | SETB | FLED | ;Set LED on flag to start flashing |
| | MOV | COUNT,#020H | ;Init counter |
| FL1 | JNB | FLED,FL3 | ;Should LED be on?, if not, then goto FL3 |
| | CLRB | LED | ;Turn LED on |
| | MOV | W,COUNT | ;Check count for 0 |
| | JZ | FL2 | ;If Z = 1, then goto FL2 |
| | DJNZ | COUNT,FL5 | ;Loop for set time in COUNT |
| FL2 | CLRB | FLED | ;Clear LED flag |
| | MOV | COUNT,#0FFH | ;Init counter |
| | MOV | COUNT1,#004H | |
| FL3 | SETB | LED | ;Turn off LED |
| | MOV | W,COUNT1 | ;Check count for 0 |
| | JZ | FL4 | ;If Z = 1, then goto FL4 |
| | DJNZ | COUNT,FL5 | ;Loop for set time in COUNT |
| | DJNZ | COUNT1,FL5 | |
| FL4 | SETB | FLED | ;Set LED on flag to start flashing |
| | MOV | COUNT,#020H | ;Init counter |
| FL5 | JB | RSET,FL1 | ;Is reset hi?, if yes, goto FL2 |
| | MOV | FLAGS,#0 | ;Clear all flags |
| | SETB | LED | ;Turn off LED |
| ; | | | |
| LCHECK | JNB | LR1,LC | ;LR1 on?, if not, goto LC |
| | JB | LR2,START | ;If yes, check LR2 and if hi, goto START |
| ; | | | |
| LC | CLRB | LED | ;Turn on LED |
| | JNB | RSET,LCHECK | ;Is reset lo?, if yes, goto LCHECK |
| | JMP | START | ;If hi, goto START |
| ; | | | |
| MAIN | NOP | | ;Do nothing |
| ; | | | |
| | JB | RON,MN1 | ;If relay on flag = 1, then goto MN1 |
| ; | | | |
| | JNB | LR1,MN5 | ;LR1 hi?, if not, goto MN5 |
| | JNB | LR2,MN5 | ;If yes, check LR2 and if lo, goto MN5 |
| ; | | | |
| MN1 | JNB | FLED,MN2 | ;Is led flag set?, if not, goto MN2 |
| ; | | | |
| | CLRB | LED | ;Turn on LED |
| | JMP | MAIN | ;Return |
| ; | | | |
| MN2 | JB | LOB,MN3 | ;Is LOB flag set?, if yes goto MN3 |
| ; | | | |
| | SETB | LOB | ;Set LOB flag |
| | MOV | T1SL,#0FFH | ;Set timer for 1 Sec. |
| | MOV | T1SH,#003H | |
| ; | | | |
| MN3 | MOV | W,T1SH | ;Is 1S timer = 0000? |
| | JNZ | HOUSE2 | ;If Z = 0, goto House keeping 2 |
| ; | | | |
| | JB | T3,MN4 | ;Is 3mS timer flag set?, if yes, goto MN4 |
| ; | | | |
| | MOV | RYCON,#00FH | ;Turn on relay pulse |
| | SETB | RON | ;Set relay on flag |
| | SETB | T3 | ;Set 3mS timer flag |
| | MOV | T3MS,#3 | ;Set timer for 2 loops |
| | MOV | T250,#0C0H | ;Load 250mS timer |
| ; | | | |
| MN4 | MOV | W,T3MS | ;Is 3mS timer = 00? |
| | JNZ | HOUSE2 | ;If Z = 0, goto House keeping 2 |
| ; | | | |
| | MOV | RYCON,#0 | ;Turn off relay pulse |
| ; | | | |

-continued

|       | MOV  | W,T250       | ;Is 250mS timer = 00?          |
|       | JNZ  | HOUSE2       | ;If Z = 0, goto House keeping 2 |
| ;     |      |              |                                |
|       | CLRB | RON          | ;Clear relay on flag           |
|       | SETB | FLED         | ;Set LED flag                  |
| ;     |      |              |                                |
|       | JMP  | MAIN         | ;Return                        |
| ;     |      |              |                                |
| MN5   | JB   | RTN,MN6      | ;Is return flag set?, if yes, goto MN6 |
| ;     |      |              |                                |
|       | SETB | LED          | ;Clear LED                     |
|       | MOV  | FLAGS,#0     | ;Clear all flags               |
|       | SETB | RTN          | ;Set return flag               |
|       | MOV  | RYCON,#0F0H  | ;Pulse relays for reset        |
|       | MOV  | T3MS,#3      | ;Set timer for 3 loops         |
|       | JMP  | MAIN         | ;Goto MAIN                     |
| ;     |      |              |                                |
| MN6   | MOV  | W,T3MS       | ;Is 3mS timer = 00?            |
|       | JNZ  | HOUSE2       | ;If Z = 0, goto House keeping 2 |
| ;     |      |              |                                |
|       | MOV  | RYCON,#0     | ;Turn off relay pulse          |
|       | MOV  | FLAGS,#0     | ;Clear all flags               |
| ;     |      |              |                                |
|       | JMP  | LCHECK       | ;Goto LCHECK                   |
| ;     |      |              |                                |
| HOUSE 2 | MOV | W,T1SH      | ;Is 1S timer = 0000?           |
|       | JZ   | H3           | ;If Z = 1, goto H3             |
|       | DJNZ | T1SL,H3      | ;T1SL = T1SL −1                |
|       | DEC  | T1SH         | ;T1SH = T1SL −1                |
| H3    | MOV  | W,T3MS       | ;Is 3mS timer = 00?            |
|       | JZ   | H4           | ;If Z = 1, goto H4             |
|       | DEC  | T3MS         | ;T1SL = T1SL −1                |
| H4    | MOV  | W,T250       | ;Is 250ms timer = 00?          |
|       | JZ   | MAIN         | ;If Z = 1, goto MAIN           |
|       | DEC  | T250         | ;T250 = T250 −1                |
|       | JMP  | MAIN         | ;Goto MAIN                     |
| ;     |      |              |                                |
| CREDITS | RETW | 'Timothy E. Dunavin' |                        |
|       | RETW | 'Antec - Anixter Mfg.' |                      |
|       | RETW | 'Rock Falls, Ill. 61701' |                    |
| ;     |      |              |                                |

A preferred embodiment of the present invention has been described herein. It is to be understood, of course, that changes and modifications may be made in the preferred embodiment without departing from the true scope and spirit of the present invention, as defined by the appended claims.

We claim:

1. A multiple access unit concentrator for a plurality of computers, each of said computers being capable of supplying a phantom voltage, comprising, in combination:
   a plurality of ports for interconnecting to and disconnecting from said computers;
   activation means for receiving a manual input and responsively issuing an activation signal to said ports; and
   a communications channel for serially connecting said ports, each of said ports including:
      a coil actuated switch for connecting one of said computers to said port and disconnecting said one of said computers from said port, said switch including a coil having first and second leads, and
      a microcontroller for monitoring said phantom voltage and said activation signal and responsively activating said switch, said microcontroller including first and second pluralities of output gates, said first lead of said coil being interconnected to said first plurality of output gates and said second lead of said coil being interconnected to said second plurality of output gates.

2. A concentrator as claimed in claim 1 wherein said activation means comprises a manually operable switch for providing a voltage signal to said microcontroller, whereby a user may activate said switch to disconnect a plurality of computers from said communications channel.

3. A concentrator as claimed in claim 2 wherein said microcontroller monitors said phantom voltage and said microcontroller imposes a positive voltage on said first lead with respect to said second lead in response to detecting said phantom voltage at a high level and said microcontroller imposes a positive voltage on said second lead with respect to said first lead in response to detecting said phantom voltage at a low level.

4. A concentrator as claimed in claim 1 wherein said phantom voltage is intermittently connected to said microcontroller and wherein said concentrator further comprises start-up delay means for inhibiting operation of said microcontroller when said phantom voltage is unstable.

5. A multiple access unit concentrator for a plurality of computers, each of said computers being capable of supplying a phantom voltage, comprising, in combination:
   a plurality of ports for connecting to and disconnecting from said computers;
   activation means for receiving a manual input and responsively issuing an activation signal to said ports; and
   a communications channel for serially connecting said ports, each of said ports including:

a coil actuated switch for connecting one of said computers to said port and disconnecting said one of said computers from said port, said switch including a coil having first and second leads, and a microcontroller for monitoring said phantom voltage and said activation signal and responsively activating said switch, said microcontroller including first and second pluralities of output gates, said first lead of said coil being interconnected to said first plurality of output gates and said second lead of said coil being interconnected to said second plurality of output gates, and wherein said phantom voltage is intermittently connected to said microcontroller and wherein said concentrator further comprises startup delay means for inhibiting operation of said microcontroller when said phantom voltage is unstable.

* * * * *